(12) United States Patent
Ogawa

(10) Patent No.: US 10,742,869 B2
(45) Date of Patent: Aug. 11, 2020

(54) IMAGE PICKUP APPARATUS AND CONTROL METHOD FOR IMAGE PICKUP APPARATUS

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 51 days.

(21) Appl. No.: 15/887,133

(22) Filed: Feb. 2, 2018

(65) Prior Publication Data
US 2018/0227480 A1    Aug. 9, 2018

(30) Foreign Application Priority Data
Feb. 3, 2017  (JP) ................. 2017-018604

(51) Int. Cl.
| | |
|---|---|
| H04N 5/232 | (2006.01) |
| G03B 13/06 | (2006.01) |
| H04N 5/235 | (2006.01) |
| G03B 17/02 | (2006.01) |
| G03B 17/20 | (2006.01) |
| G06F 3/0482 | (2013.01) |

(Continued)

(52) U.S. Cl.
CPC ......... *H04N 5/23216* (2013.01); *G03B 13/06* (2013.01); *G03B 17/02* (2013.01); *G03B 17/20* (2013.01); *G06F 3/00* (2013.01); *G06F 3/0482* (2013.01); *G06F 3/0488* (2013.01); *H04N 5/2353* (2013.01); *H04N 5/23212* (2013.01); *H04N 5/23245* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 2011/0267526 A1* | 11/2011 | Ishihara | ............... | G03B 3/10 348/333.01 |
| 2013/0155276 A1* | 6/2013 | Ueda | ............... | G02B 7/36 348/223.1 |

(Continued)

FOREIGN PATENT DOCUMENTS

| | | |
|---|---|---|
| JP | 2012-203143 A | 10/2012 |
| JP | 2016-181065 A | 10/2016 |

*Primary Examiner* — Twyler L Haskins
*Assistant Examiner* — Wesley J Chiu
(74) *Attorney, Agent, or Firm* — Carter, DeLuca & Farrell LLP

(57) ABSTRACT

An image pickup apparatus includes a touch detecting unit configured to be capable of detecting a touch operation performed on a touch panel; a viewfinder display unit configured to display a display indicating a set value of an item inside a viewfinder; and a control unit configured to execute control such that, in a case where a subject image is visible through the viewfinder, a set value of a first item is changed in response to a touch operation performed on the touch panel when a predetermined operation relating to image pickup is not being performed, and a set value of a second item that is different from the first item is changed in response to a touch operation performed on the touch panel when the predetermined operation is being performed.

16 Claims, 7 Drawing Sheets

| SETTING ITEM | TOUCH-DOWN PROCESSING | TOUCH-MOVE PROCESSING | TOUCH-UP PROCESSING |
|---|---|---|---|
| SINGLE POINT AF | — | CHANGE AF FRAME POSITION | CONFIRM AF POSITION |
| TRACKING AF | CANCEL TRACKING | CHANGE TRACKING FRAME POSITION | CHANGE TRACKING SUBJECT/START TRACKING |
| ISO SENSITIVITY | — | CHANGE ISO SENSITIVITY | — |
| HDR | — | CHANGE HDR STRENGTH | — |
| CONTRAST | — | CHANGE STRENGTH | — |
| DISPLAY SWITCH | SWITCH | — | — |
| APERTURE SETTING | — | CHANGE APERTURE VALUE | — |
| EXPOSURE CORRECTION | — | CHANGE EXPOSURE CORRECTION | — |

(51) Int. Cl.
*G06F 3/0488* (2013.01)
*G06F 3/00* (2006.01)

(56) References Cited

U.S. PATENT DOCUMENTS

| | | | |
|---|---|---|---|
| 2014/0049677 A1* | 2/2014 | Kawaguchi | H04N 5/23216 348/333.01 |
| 2014/0085233 A1* | 3/2014 | Sudo | G06F 3/0488 345/173 |
| 2014/0098273 A1* | 4/2014 | Ito | H04N 5/23216 348/333.03 |
| 2014/0307276 A1* | 10/2014 | Koga | H04N 1/0035 358/1.9 |
| 2015/0124116 A1* | 5/2015 | Nakajima | G03B 17/02 348/222.1 |
| 2015/0138438 A1* | 5/2015 | Tomizawa | H04N 5/2254 348/374 |
| 2017/0019603 A1* | 1/2017 | Kim | H04N 5/23216 |
| 2019/0146310 A1* | 5/2019 | Misawa | H04N 5/225 396/296 |

* cited by examiner

FIG.4

TOUCHPAD SETTING (WHILE LOOKING THROUGH VIEWFINDER)

USE TOUCHPAD WHILE LOOKING THROUGH VIEWFINDER — USE ▽

NORMALLY — SINGLE POINT AF ▽

WHEN SHUTTER BUTTON IS PRESSED HALFWAY — EXPOSURE CORRECTION ▽

FIG. 5A

| SETTING ITEM | TOUCH-DOWN PROCESSING | TOUCH-MOVE PROCESSING | TOUCH-UP PROCESSING |
|---|---|---|---|
| SINGLE POINT AF | — | CHANGE AF FRAME POSITION | CONFIRM AF POSITION |
| TRACKING AF | CANCEL TRACKING | CHANGE TRACKING FRAME POSITION | CHANGE TRACKING SUBJECT/START TRACKING |
| ISO SENSITIVITY | — | CHANGE ISO SENSITIVITY | — |
| HDR | — | CHANGE HDR STRENGTH | — |
| CONTRAST | — | CHANGE STRENGTH | — |
| DISPLAY SWITCH | SWITCH | — | — |
| APERTURE SETTING | — | CHANGE APERTURE VALUE | — |
| EXPOSURE CORRECTION | — | CHANGE EXPOSURE CORRECTION | — |

FIG. 5B

| SETTING ITEM | WHEN IMAGE PICKUP PREPARATION INSTRUCTION ISSUED | SETTABLE SETTING ITEMS WHEN IMAGE PICKUP PREPARATION INSTRUCTION ISSUED | WHEN IMAGE PICKUP PREPARATION INSTRUCTION CANCELED (WHEN SHUTTER BUTTON NOT PRESSED) |
|---|---|---|---|
| SINGLE POINT AF | SWITCH (CONFIRM WHEN TOUCH UNDERWAY) | EXPOSURE CORRECTION, CONTRAST CORRECTION, HDR | RETURN TO NORMAL |
| TRACKING AF | AS IS | — | — |
| ISO SENSITIVITY | CONFIRM/SWITCH | EXPOSURE CORRECTION, CONTRAST CORRECTION, HDR, TRACKING AF | RETURN TO NORMAL |
| HDR | CONFIRM/SWITCH | EXPOSURE CORRECTION, CONTRAST CORRECTION, TRACKING AF | RETURN TO NORMAL |
| CONTRAST | CONFIRM/SWITCH | EXPOSURE CORRECTION, HDR, TRACKING AF | RETURN TO NORMAL |
| DISPLAY SWITCH | SWITCH | EXPOSURE CORRECTION, CONTRAST CORRECTION, HDR, TRACKING AF | RETURN TO NORMAL |
| APERTURE SETTING | CONFIRM/SWITCH | EXPOSURE CORRECTION, CONTRAST CORRECTION, HDR, TRACKING AF | RETURN TO NORMAL |
| EXPOSURE CORRECTION | CONFIRM/SWITCH | CONTRAST CORRECTION, HDR, TRACKING AF | RETURN TO NORMAL |

IMAGE PICKUP APPARATUS AND CONTROL METHOD FOR IMAGE PICKUP APPARATUS

BACKGROUND OF THE INVENTION

Field of the Invention

The present invention relates to an image pickup apparatus and a control method therefor, and more particularly to a technique employed when switching an item, the set value of which is to be changed by a touch operation during image pickup.

Description of the Related Art

In a conventional technique, a set value is changed by performing a touch operation while looking through a viewfinder. Japanese Patent Application Publication No. 2012-203143 states that a user can change an AF target position in which AF processing is to be performed by performing a touch operation on a back surface monitor when the user is looking through a viewfinder. Further, a method for switching an item to be subjected to setting change exists. Japanese Patent Application Publication No. 2016-181065 states that when a parent item is selected, a bar or a display item indicating a set value is displayed in order to receive setting change in relation the selected parent item.

In the method disclosed in Japanese Patent Application Publication No. 2012-203143, the AF position setting can be changed by a touch operation while looking through the viewfinder, but the settings of other items cannot be changed. In Japanese Patent Application Publication No. 2016-181065, meanwhile, the settings of various items can be changed, but in a case where the user is looking through the viewfinder, as in Japanese Patent Application Publication No. 2012-203143, the user must temporarily take his/her eye away from the viewfinder in order to perform an operation for changing the item, with the result that an image pickup operation is temporarily interrupted. Similarly, when the user changes the way in which a digital camera is held in order to change an item setting while the digital camera is poised for image pickup immediately prior to image pickup, image pickup can no longer be performed quickly.

SUMMARY OF THE INVENTION

In the light of the problem described above, an object of the present invention is to achieve an improvement in operability when switching an item in relation to which a setting is to be changed by a touch operation during image pickup.

To achieve the object described above, an image pickup apparatus according to the present invention includes: a touch detecting unit configured to be capable of detecting a touch operation performed on a touch panel; a viewfinder display unit configured to display a display indicating a set value of an item inside a viewfinder; and a control unit configured to execute control such that, in a case where a subject image is visible through the viewfinder, a set value of a first item is changed in response to a touch operation performed on the touch panel when a predetermined operation relating to image pickup is not being performed, and a set value of a second item that is different from the first item is changed in response to a touch operation performed on the touch panel when the predetermined operation is being performed.

To achieve the object described above, an image pickup apparatus according to the present invention includes: a touch detecting unit configured to be capable of detecting a touch operation performed on a touch panel; a display unit configured to display a live view image; and a control unit configured to execute control such that, in a case where a live view image is displayed on the display unit, a set value of a first item relating to image pickup is changed in response to a touch operation performed on the touch panel when an image pickup preparation instruction is not being issued, and a set value of a second item relating to image pickup is changed in response to a touch operation performed on the touch panel when the image pickup preparation instruction is being issued.

To achieve the object described above, a control method for an image pickup apparatus having a viewfinder display unit for displaying a display indicating a set value of an item inside a viewfinder, the control method includes: detecting a touch operation performed on a touch panel; and executing control such that, in a case where a subject image is visible through the viewfinder, a set value of a first item is changed in response to a touch operation performed on the touch panel when a predetermined operation relating to image pickup is not being performed, and a set value of a second item that is different from the first item is changed in response to a touch operation performed on the touch panel when the predetermined operation is being performed.

To achieve the object described above, a control method for an image pickup apparatus having display unit configured to display a live view image, the control method includes: detecting a touch operation performed on a touch panel; and executing control such that, in a case where a live view image is displayed on the display unit, a set value of a first item relating to image pickup is changed in response to a touch operation performed on the touch panel when an image pickup preparation instruction is not being issued, and a set value of a second item relating to image pickup is changed in response to a touch operation performed on the touch panel when the image pickup preparation instruction is being issued.

To achieve the object described above, a non-transitory computer readable storing medium records a computer program for causing a computer to perform a control method for an image pickup apparatus having a viewfinder display unit for displaying a display indicating a set value of an item inside a viewfinder, the control method includes: detecting a touch operation performed on a touch panel; and executing control such that, in a case where a subject image is visible through the viewfinder, a set value of a first item is changed in response to a touch operation performed on the touch panel when a predetermined operation relating to image pickup is not being performed, and a set value of a second item that is different from the first item is changed in response to a touch operation performed on the touch panel when the predetermined operation is being performed.

To achieve the object described above, a non-transitory computer readable storing medium records a computer program for causing a computer to perform a control method for an image pickup apparatus having display unit configured to display a live view image, the control method includes: detecting a touch operation performed on a touch panel; and executing control such that, in a case where a live view image is displayed on the display unit, a set value of a first item relating to image pickup is changed in response to a touch operation performed on the touch panel when an image pickup preparation instruction is not being issued, and a set value of a second item relating to image pickup is changed in response to a touch operation performed on the touch panel when the image pickup preparation instruction is being issued.

Further features of the present invention will become apparent from the following description of exemplary embodiments (with reference to the attached drawings).

BRIEF DESCRIPTION OF THE DRAWINGS

FIG. 4 is an example of a setting screen on which touchpad setting is performed while looking through a viewfinder;

FIGS. 5A and 5B are views illustrating touch processing executed in a normal state and when an image pickup preparation instruction has been issued.

DESCRIPTION OF THE EMBODIMENTS

Figure 1A:
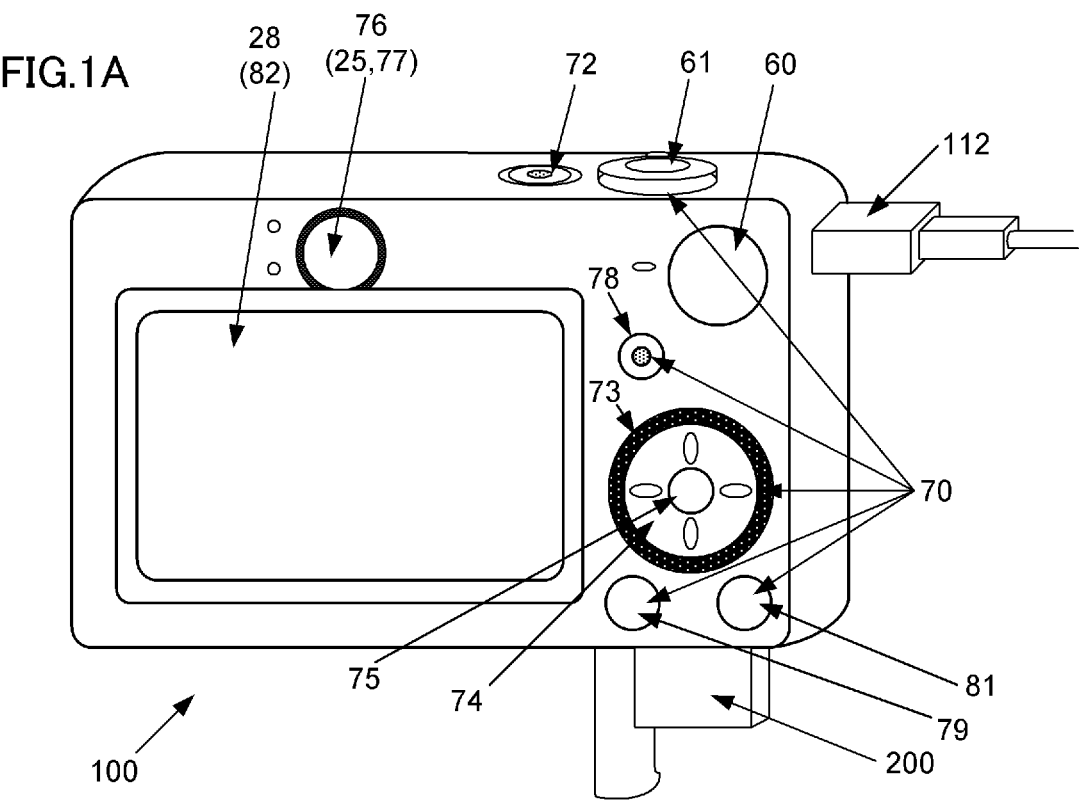
FIGS. 1A and 1B are views showing examples of the outer appearance of a digital camera.

A preferred embodiment of the present invention will be described in detail below with reference to the figures. In the figures, identical configurations have, as a rule, been allocated identical reference numerals, and duplicate description thereof has been omitted. Further, unless specified otherwise, the present invention is not limited to numerical values used to illustrate specific examples thereof.

Furthermore, the present invention is not limited to the embodiment described below, and may be modified appropriately within a scope that does not depart from the spirit thereof. For example, the respective configurations of the embodiment described below may be amended or modified appropriately in accordance with the configuration of the apparatus to which the present invention is applied and various conditions.

First Embodiment

An example embodiment of the present invention will be described in detail below with reference to the attached figures.

External Configuration of Digital Camera 100

Figure 1B:
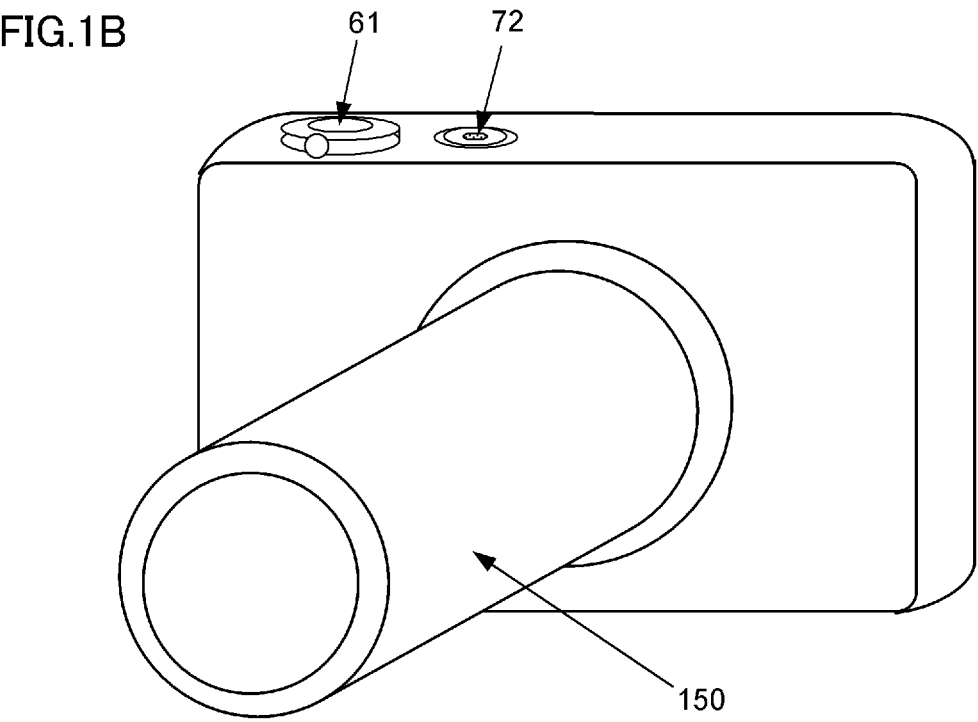

FIGS. 1A and 1B are views showing examples of the outer appearance of a digital camera 100. FIG. 1A is a perspective view showing the rear of the digital camera 100, and FIG. 1B is a perspective view showing the front of the digital camera 100.

In FIG. 1A, the digital camera 100 includes a display unit 28, a mode switching switch 60, a shutter button 61, an operation unit 70, a power supply switch 72, a viewfinder 76, and a recording medium 200. The display unit 28 is capable of displaying captured images, reproduced images, various information, and so on, and is provided as an operating surface integrally with a touch panel 82 that is capable of receiving touch operations (capable of detecting touch). Any display that displays images may be used as the display unit 28, and instead of a liquid crystal display, another type of display, such as an organic EL display, may be used.

The viewfinder 76 includes an eye approach sensor 77 and a viewfinder display unit 25.

The eye approach sensor 77 is capable of detecting the approach of an object to a distance of less than a predetermined distance such as one or two centimeters. Further, the viewfinder display unit 25 is provided in the interior of the viewfinder 76 and constituted by an electronic viewfinder (EVF). By displaying a live view image alongside information relating to image pickup and so on, a user can ascertain the condition of a subject together with image pickup information.

Note that the viewfinder display unit 25 may be an optical viewfinder (OVF) rather than an EVF. In the case of an OVF, while a mirror is down, an optical image formed on a focusing screen (not shown) can be viewed through the viewfinder, and in this case, display relating to image pickup and so on, generated by the viewfinder display unit 25 (liquid crystal), can be superimposed on (or disposed on the periphery of) the optical image. For example, when an AF frame is displayed in a position overlapping the position of the subject set in the viewfinder display unit 25, the user can ascertain an AF position. Further, for example, when the user brings an eye close to the viewfinder display unit 25 such that the eye approach sensor 77 detects the approach of the user, the display can be switched to the viewfinder display unit 25 so that the user can see the condition of the subject. The viewfinder display unit 25 displays a frame (to be referred to hereafter as a cursor) indicating the autofocus (AF) position, and icons and the like (display items, marks, symbols, and so on) representing a setting state. The AF frame is displayed so as to be superimposed on the live view image, and therefore the position in which AF processing is to be performed can be ascertained easily.

Further, when the eye approach sensor 77 detects that the eye of the user has moved away by at least a predetermined distance, the digital camera 100 switches the display from the viewfinder display unit 25 to the display unit 28.

Note that the eye approach sensor 77 does not necessarily have to be provided, and a switch button (for example, an LV button 78 to be described below) or the like used by the user to switch the display destination may be provided instead. In the case of an electronic viewfinder, a live view image is switched between the display unit 28 and the viewfinder display unit 25. In the case of an optical viewfinder, it is possible to switch between a condition in which the mirror is down so that an optical image can be viewed through the viewfinder, and a condition in which the mirror is up (i.e. an optical path is blocked so that an optical image cannot be viewed) and a live view image is displayed on the display unit 28.

Furthermore, when a live view image (an LV image) is displayed on the viewfinder display unit 25, nothing is displayed on the display unit 28, but the touch panel 82 can receive the AF position and various types of processing in response to touch operations performed by the user. For example, the digital camera 100 can change the position of the frame indicating the AF position in response to a touch operation performed by the user.

The mode switching switch 60 is an operation unit for switching between various image pickup modes. A connector 112 is an interface for connecting the digital camera 100 to an external device by means of a connection cable.

The operation unit 70 is a configuration for operating the digital camera 100, and includes the shutter button 61, an electronic dial 73, a four-way key 74, a SET button 75, the LV button 78, a play button 79, and a menu button 81.

The shutter button 61 is an operation unit for issuing an image pickup instruction. When the shutter button 61 is pressed halfway, an image pickup preparatory state is established, and in this state, autofocus (AF) processing, automatic exposure (AE) processing, automatic white balance (AWB) processing, pre-flash light emission (EF) processing, and so on are executed. Further, when the shutter button 61 is pressed fully, an image pickup instruction is issued. Note that pressing halfway denotes a depression state midway through an operation for pressing the shutter button.

The electronic dial 73 is a rotary operating member, and by rotating the electronic dial 73, set values such as a shutter speed and an aperture can be changed and so on. The four-way key 74 is a cross-shaped key (a four-direction key) having upper, lower, left, and right parts that can be pressed. Operations can be implemented in accordance with the part of the four-way key 74 that is pressed. The SET button 75 is a button pressed mainly to determine a selected item and so on. The LV button (live view button) 78 is a button for switching live view (LV hereafter) display by the display unit 28 ON and OFF while in a static image pickup mode. In a moving image pickup mode, the LV button 78 is used to issue instructions to start and stop moving image pickup (recording). The play button 79 is an operating button for switching between the image pickup mode and a reproduction mode. By pressing the play button 79, the reproduction mode is set, and as a result, the newest image among images recorded on the recording medium 200 can be displayed on the display unit 28.

The power supply switch 72 is an operating member for switching a power supply of the digital camera 100 ON and OFF. The recording medium 200 is a memory card or the like having an area for recording captured image data.

The menu button 81 is a button for opening a menu screen on which to perform various settings in relation to the digital camera 100. When the menu button 81 is pressed, the menu screen is displayed on the display unit 28. The user can perform various settings in relation to the digital camera 100 on the menu screen using the four-way key 74 and the SET button 75.

In FIG. 1B, a lens unit 150 is installed with an image pickup lens.

Internal Configuration of Digital Camera 100

Figure 2:
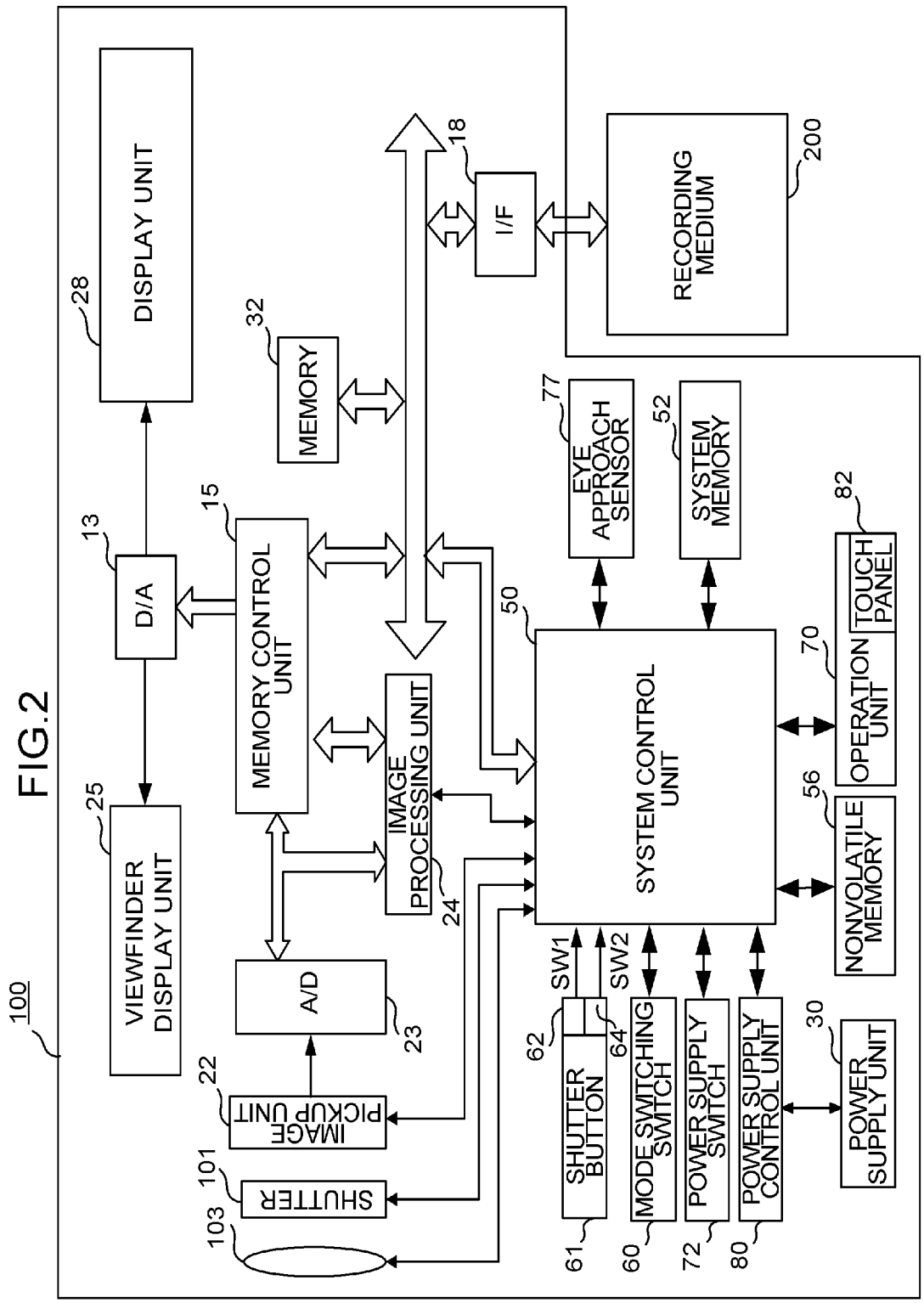
FIG. 2 is a block diagram showing an example of an internal configuration of the digital camera.

FIG. 2 is a block diagram showing an example of the internal configuration of the digital camera 100.

A lens 103 is typically constituted by a plurality of lenses, but here, for simplicity, only one lens is shown. A shutter 101 is configured to be openable and closeable, and operates in response to depression of the shutter button 61. An image pickup unit 22 is an imaging device constituted by a CCD, a CMOS device, or the like that converts an optical image into an electric signal.

An A/D converter 23 converts an analog signal output by the image pickup unit 22 into a digital signal. Output data from the A/D converter 23 are either written to a memory 32 via an image processing unit 24 and a memory control unit 15, or written directly to the memory 32 via the memory control unit 15.

The memory 32 stores image data obtained by the image pickup unit 22 and converted into digital data by the A/D converter 23, and image data to be displayed on the display unit 28. The memory 32 has sufficient storage capacity to store a predetermined number of static images, or moving images and sound lasting a predetermined time. The memory 32 also doubles as an image display memory (a video memory).

The image processing unit 24 performs predetermined pixel interpolation processing, resizing processing, i.e. reduction, and color conversion processing on data from the A/D converter 23 and data from the memory control unit 15.

Further, the image processing unit 24 performs predetermined calculation processing using captured image data, whereupon the system control unit 50 performs exposure control and range-finding control on the basis of an obtained calculation result. As a result, through the lens (TTL) type autofocus (AF) processing, automatic exposure (AE) processing, and pre-flash light emission (EF) processing are executed. Furthermore, the image processing unit 24 performs predetermined calculation processing using the captured image data, and executes TTL type automatic white balance (AWB) processing on the basis of an obtained calculation result.

A D/A converter 13 converts the image display data stored in the memory 32 into an analog signal, and supplies the analog signal to the display unit 28. The digital signals initially subjected to A/D conversion by the A/D converter 23 and stored in the memory 32 are converted into analog signals by the D/A converter 13. Hence, the display image data written to the memory 32 are displayed by the display unit 28 via the D/A converter 13. The display unit 28 implements display corresponding to the analog signal from the D/A converter 13 on a display such as an LCD.

Further, when display is underway in the viewfinder display unit 25, analog signals are transferred successively to the viewfinder display unit 25 and displayed thereon, whereby the viewfinder display unit 25 functions as an electronic viewfinder.

The system control unit 50 controls the entire digital camera 100. By executing a program recorded on a nonvolatile memory 56, various types of processing according to this embodiment, to be described below, are realized. A system memory 52 is a RAM or the like. Constants and variables used in the operations of the system control unit 50, the program read from the nonvolatile memory 56, and so on are expanded in the system memory 52. The system control unit 50 also controls the images displayed on the display unit 28, the viewfinder display unit 25, and so on.

Further, the system control unit 50 performs control to displace a position of the lens 103 by receiving defocus amount information relating to a captured image from an AF sensor, not shown in the figure, and executing phase detection AF on the basis of the defocus amount information. Note that the AF method does not have to be phase detection AF, and contrast AF may be employed instead. Further, when an instant return mirror or a sub-mirror is provided, an image that enters through the mirror may be captured, and defocus amount information may be output to the system control unit 50. Contrast AF may be employed as the AF method instead of phase detection AF. Moreover, phase detection AF may be performed on the basis of a defocus amount detected by an imaging surface of the image pickup unit 22, instead of using a focal point detection unit 11 (imaging surface phase detection AF).

The nonvolatile memory 56 is an electrically deletable and recordable memory such as an EEPROM, for example. The nonvolatile memory 56 stores constants used during the operations of the system control unit 50, a program, and so on. Here, the program is a program for executing various flowcharts according to this embodiment, to be described below.

The mode switching switch 60, the shutter button 61, and the operation unit 70 serve as operating means for inputting various operating instructions into the system control unit 50.

The mode switching switch 60 switches an operating mode of the system control unit 50 between the image pickup mode, the reproduction mode, and so on. Various scene modes for performing image pickup settings according to the scene to be captured, a program AE mode, a custom mode, and so on also exist. The mode switching switch 60 is used to switch directly between these modes. Alternatively, after switching temporarily to the menu screen, the modes, which are included on the menu screen, may be switched using another operating member.

A first shutter switch 62 is switched ON midway through an operation of the shutter button 61 provided on the digital camera 100, or in other words when the shutter button 61 is pressed halfway (when an image pickup preparation instruction is issued), whereby a first shutter switch signal SW1 is generated. In response to the first shutter switch signal SW1, the system control unit 50 starts operations relating to autofocus (AF) processing, automatic exposure (AE) processing, automatic white balance (AWB) processing, pre-flash light emission (EF) processing, and so on.

A second shutter switch 64 is switched ON at the end of the operation of the shutter button 61, or in other words when the shutter button 61 is pressed fully (when an image pickup instruction is issued), whereby a second shutter switch signal SW2 is generated. In response to the second shutter switch signal SW2, the system control unit 50 starts operations relating to a series of image pickup processes extending from reading a signal from the image pickup unit 22 to writing image data to the recording medium 200.

The respective operating members of the operation unit 70 are assigned functions as appropriate in accordance with the situation by performing operations to select various function icons displayed on the display unit 28 or the like, and thus act as various function buttons.

For example, when the SET button 75 is pressed while a live view image is displayed on the display unit 28, the system control unit 50 displays the menu screen. On the menu screen, the user can perform execute settings intuitively using the four-way key 74 and the SET button 75.

A power supply control unit 80 is constituted by a battery detection circuit, a DC-DC converter, a switch circuit for switching a block to be energized, and so on, and detects whether or not a battery is attached, the type of the battery, and the state of charge of the battery. Further, the power supply control unit 80 controls the DC-DC converter on the basis of the detection results and an instruction from the system control unit 50 in order to supply required voltages to respective parts including the recording medium 200 for required periods.

The power supply switch 72 receives operations for switching a power supply ON and OFF. A power supply unit 30 is constituted by a primary battery such as an alkali battery or a lithium battery, a secondary battery such as an NiCd battery, an NiMH battery, or an Li battery, an AC adapter, and so on.

A recording medium I/F 18 is an interface to the recording medium 200, which is a memory card, a hard disk, or the like. The recording medium 200 is a recording medium such as a memory card on which to record captured images, and is constituted by a semiconductor memory, a magnetic disk, or the like.

The operation unit 70 also includes the touch panel 82, which is capable of detecting contact with the display unit 28. The touch panel 82 and the display unit 28 are formed integrally. For example, the touch panel 82 is attached to an upper layer of a display surface of the display unit 28, and the touch panel 82 transmits sufficient light to ensure that the display on the display unit 28 is not impaired. The system control unit 50 associates input coordinates on the touch panel 82 with display coordinates on the display unit 28.

Note that the touch panel 82 may employ any one of various systems, such as a resistive film system, an electrostatic capacitance system, a surface acoustic wave system, an infrared system, an electromagnetic induction system, an image recognition system, and an optical sensor system. Depending on the system, either a system that detects contact with the touch panel as a touch or a system that detects the approach of a finger or a pen toward the touch panel as a touch may be employed.

With the configuration described above, it is possible to construct a graphical user interface (GUI) giving the impression that the user can directly operate a screen displayed on the display unit 28. Accordingly, setting in which an instruction is received by associating a position on the touch panel 82 where a touch operation is performed with a position on the display unit 28 will be referred to as absolute coordinate setting.

Further, in contrast to absolute coordinate setting, setting in which an instruction is received in a position corresponding to a movement amount, a movement direction, and so on of a touch operation performed from a predetermined position on the display unit 28 (i.e. a position reached after moving by an amount corresponding to the movement operation), rather than a position corresponding to the touch position, will be referred to as relative coordinate setting.

When an operation is performed while looking through the viewfinder display unit 25, a touch operation may be performed by either absolute coordinate setting or relative coordinate setting. When a touch operation is performed by relative coordinate setting, a movement instruction is issued in accordance with the movement amount rather than the position of the touch operation, and therefore the user can specify a desired position by performing an operation to move an operation subject displayed on the viewfinder display unit 25 to the desired position while viewing the operation subject. In the case of absolute coordinate setting, a position can be specified by touching an approximate position, whereupon fine setting can be realized by performing touch-moves.

When relative coordinate setting is used during an operation performed while viewing the display unit 28, however, the touch position may deviate from the specified position, leading to a reduction in operability. Therefore, during an operation performed while viewing the display unit 28, absolute coordinate setting is used.

Hence, the system control unit 50 uses absolute coordinate setting when the user performs an operation while viewing the display unit 28, and switches to relative coordinate setting upon reception of a signal from the eye approach sensor 77 indicating that the approach of an eye has been detected. Hereafter, a function of the touch panel 82 for receiving a touch operation in a state where no image is displayed on the display unit 28 will be referred to as a touchpad function.

Furthermore, when using the touchpad function, touch operations in a partial region of the touch panel 82 may be disabled so that even if the nose of the user touches the touch panel 82 unintentionally as the user operates the touch panel 82 while looking through the viewfinder, processing not intended by the user is not performed.

Note that the user may select either absolute coordinate setting or relative coordinate setting when using the touchpad function.

The system control unit 50 is capable of detecting following operations or states (1) to (5) on the touch panel 82.

(1) A finger or a pen not touching the touch panel newly touches the touch panel. In other words, a touch is started (referred to hereafter as a touch-down).

(2) The finger or pen is moved while still touching the touch panel (referred to hereafter as a touch-move).

(3) The finger or pen touching the touch panel is removed. In other words, a touch is terminated (referred to hereafter as a touch-up).

(4) The finger or pen is currently touching the touch panel (referred to hereafter as a touch-on).

(5) Nothing is currently touching the touch panel (referred to hereafter as a touch-off).

Note that a touch-down is an operation for starting to touch the touch panel 82, while a touch-on indicates a state in which something is touching the touch panel 82. Further, a touch-up is an operation for removing a finger or a pen from the touch panel 82, while a touch-off denotes a state in which nothing is touching the touch panel 82.

Further, when a touch-down is detected, a touch-on is detected at the same time. In a normal state, a touch-on continues to be detected following a touch-down until a touch-up is detected. A touch-move is also detected in a state where a touch-on is detected. Even when a touch-on is detected, a touch-move is not detected unless the touch position moves. Furthermore, when it is detected that all touching fingers and pens have performed a touch-up, a touch-off is detected.

The system control unit 50 is notified of these operations and states, as well as the coordinates of the position in which the finger or pen is touching the touch panel, via an internal bus, and on the basis of the notified information, the system control unit 50 determines the nature of the operation performed on the touch panel.

For example, with regard to a touch-move, the system control unit 50 can also determine each vertical component and each horizontal component on the touch panel of a movement direction in which the finger or pen moves over the touch panel on the basis of variation in the position coordinates.

Further, an AF mode to be described below includes "face+tracking priority AF" (referred to hereafter as tracking AF), which is a mode in which AF is performed while tracking the subject, and "single point AF", which is a mode in which AF is performed at a fixed point, regardless of the subject. Note that the AF mode does not have to be limited to these two modes, and a mode ("zone AF") in which tracking AF is performed within a limited range specified by the user, or the like may also be employed.

In processing to be described below, the touchpad function, in which functions are executed by operating the touch panel 82 on the exterior of the viewfinder while looking through the viewfinder, will be described. Setting items that can be set as the touchpad function include, for example, a "single point AF setting function", a "tracking AF setting function", an "ISO sensitivity setting function", an "HDR setting function", a "contrast setting function", an "aperture setting function", an "exposure correction setting function", and so on. Moreover, in the embodiment to be described below, the touchpad function in a state where the shutter button 61 is pressed halfway is interchangeable with the touchpad function in a state where the shutter button 61 is not pressed. The touchpad function can also be used to activate or inactivate the touchpad function on the menu screen, and to set the function to be assigned as the touchpad function when the touchpad function is activated. Two touchpad functions can be set, namely a touchpad function set when an image pickup preparation instruction has been issued and a touchpad function set when an image pickup preparation instruction has not been issued. FIG. 4 shows an example of a touchpad setting screen on which setting can be performed in relation to the touchpad function. When the user selects the item "Touchpad setting (while looking through viewfinder)" from the menu screen, a setting screen 401 is displayed on the display unit 28.

An item "Use touchpad while looking through viewfinder", an item "Normally", and an item "When shutter button is pressed halfway" are displayed on the setting screen 401. Each item is a dropdown list, and the list is expanded by pressing an inverted triangular button. The user can select the setting content shown on the list by operating the touch panel 82 or the four-way key 74 and the SET button 75.

On the item "Use touchpad while looking through viewfinder", "Use" and "Do not use" can be selected. When "Use" is selected, the touch panel 82 is activated even while the user looks through the viewfinder, and accordingly, touch operations performed by the user are detected. When "Do not use" is selected, on the other hand, the touch panel 82 is inactivated while the user looks through the viewfinder.

On the "Normally" item, a touchpad function to be used in a (normal) state where the user has not issued an image pickup preparation instruction while looking through the viewfinder can be selected. For example, any one of the "single point AF setting function", the "tracking AF setting function", the "ISO sensitivity setting function", the "HDR setting function", the "contrast setting function", the "aperture setting function", and the "exposure correction setting function" can be selected.

On the item "When shutter button is pressed halfway", a touchpad function to be used when the user has issued an image pickup preparation instruction while looking through the viewfinder can be selected. For example, when the "single point AF setting function" has been selected on the item "Normally", the "ISO sensitivity setting function", the "HDR setting function", the "contrast setting function", and so on can be selected on the item "When shutter button is pressed halfway". The candidate items that can be set on the item "When shutter button is pressed halfway" vary according to the item set under "Normally". Conversely, the items that can be set under "Normally" vary according to the item set under "When shutter button is pressed halfway".

Figure 3:
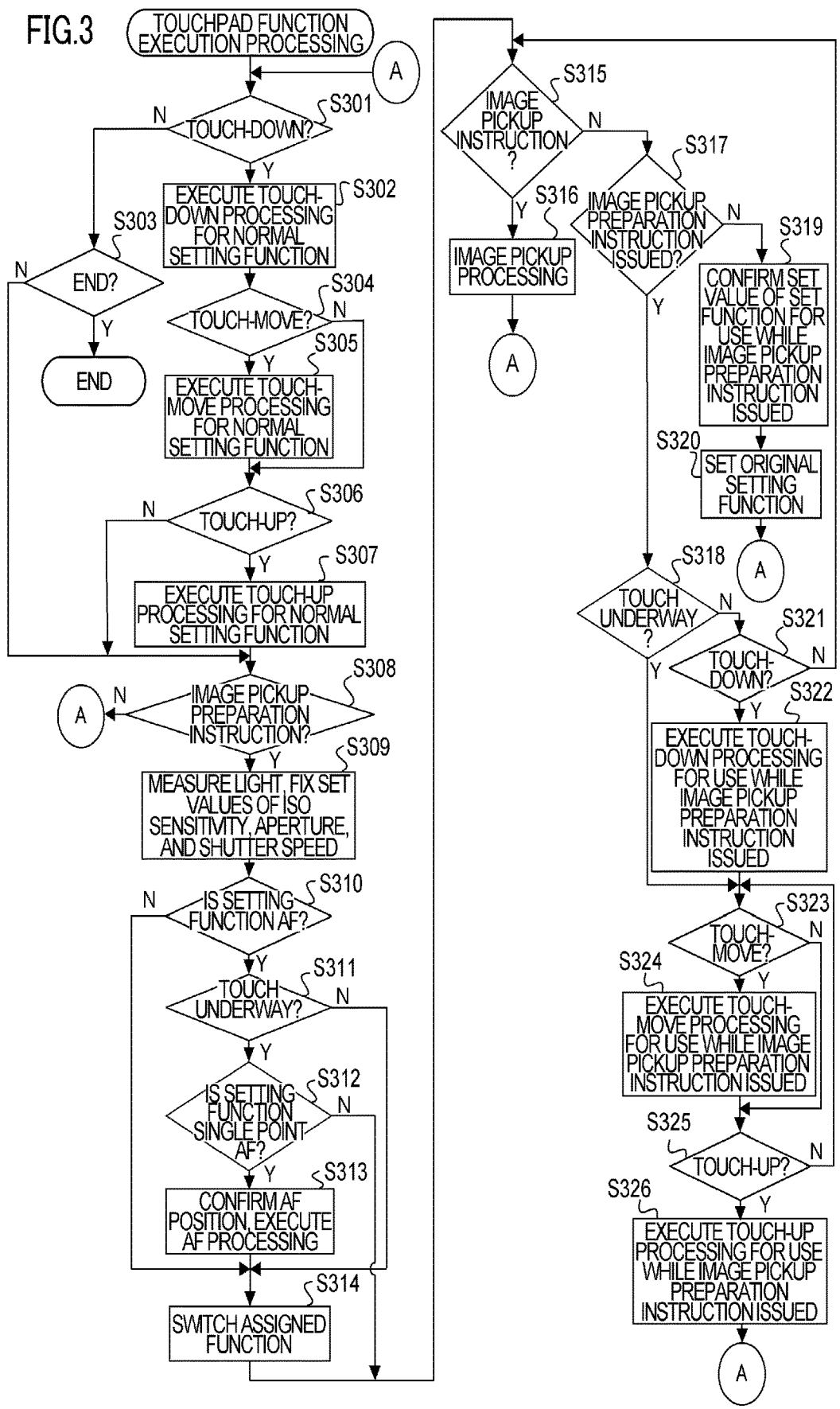
FIG. 3 is a view showing an example flow of overall processing executed by a system control unit.
Figure 6A:
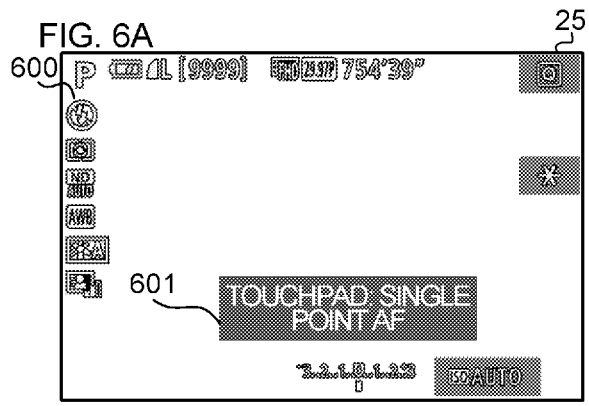
FIGS. 6A to 6D are views showing examples of displays on a viewfinder display unit.

FIG. 3 is a view showing a flowchart of touchpad function execution processing executed by the system control unit 50. This processing is performed while the user looks through the viewfinder, and starts when a state in which a subject image is visible through the viewfinder 76 and a touchpad function can be received by performing a touch operation on the display unit 28 (the touch panel 82) is established. In other words, the processing starts in a state where a live view image is not displayed on the display unit 28, and the display surface functions as a touchpad such that the user can change settings such as the AF position and the ISO sensitivity while viewing the subject image through the viewfinder 76. The processing is realized by expanding the program stored on the nonvolatile memory 56 in the system memory 52 and having the system control unit 50 execute the program. In step S301, the system control unit 50 determines whether or not a touch-down has been implemented (i.e. whether or not a touch has been started) on the touch panel 82. When a touch-down has been implemented, the system control unit 50 executes touch-down processing corresponding to the normal setting function in step S302. The "touch-down processing corresponding to the normal setting function" is processing executed when a touch-down is performed on the touch panel 82 in a normal state, i.e. when the shutter button 61 is not pressed. Processing corresponding to touch-down processing for the normal touchpad function is executed. FIG. 5A illustrates the setting items of the touchpad function, and the processing that is executed when a touch-down, a touch-move, or a touch-up is executed in relation to each setting item. For example, when tracking AF is set as the touchpad function, tracking is canceled by performing a touch-down, the position of a tracking frame is changed by performing a touch-move, and the tracking subject is changed (or confirmed) and tracking is started by performing a touch-up. Further, when single point AF is set, no specific processing is performed when a touch-down is performed, the position of the AF frame is changed by performing a touch-move, and the AF position is confirmed by performing a touch-up. Further, as illustrated by a display item 601 shown in the viewfinder display unit 25 in FIG. 6A, the setting item set as the touchpad function may be displayed in response to a touch-down. FIG. 6A shows an example of a display displayed on the viewfinder display unit 25 when single point AF is set as the touchpad function. By displaying the display item 601, the user can ascertain that it is possible to change the AF position by performing a touch operation.

Note that when no processing corresponds to the touch-down processing, the processing of S302 is not executed.

Also note that in a case where a touch has been performed prior to step S301, the system control unit 50 may advance to processing of step S304 without executing the touch-down processing.

When it is determined in step S301 that a touch-down has not been performed, the processing advances to step S303, where the system control unit 50 determines whether or not an operation for terminating the touchpad function execution processing has been performed. When it is determined that a termination operation has been performed, the touchpad function execution processing is terminated. The touchpad function execution processing is terminated when the eye of the user moves away from the viewfinder 76, an operation is performed to transition to the menu screen or the reproduction screen, or the power supply is switched OFF.

When, on the other hand, the system control unit 50 determines in step S303 that the touchpad function execution processing has not been terminated, the processing advances to step S308.

Figure 6B:
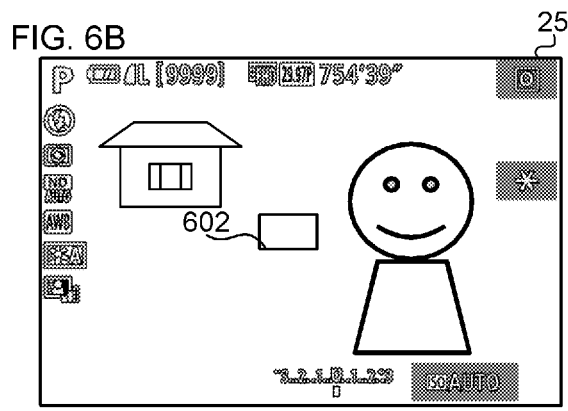

In step S304, the system control unit 50 determines whether or not a touch-move has been performed on the touch panel 82. When a touch-move is detected, the system control unit 50 executes touch-move processing corresponding to the normal setting function in step S305. The "touch-move processing corresponding to the normal setting function" is processing executed when a touch-move is performed on the touch panel 82 in a normal state, i.e. when the shutter button 61 is not pressed. FIG. 6B shows an example of a display displayed on the viewfinder display unit 25 when single point AF is set as the touchpad function, and in FIG. 6B, the display position of an AF frame 602 is changed in response to the touch-move operation. The user moves the AF frame 602 to a desired position on the subject while viewing the position of the AF frame and the position of the subject, and in so doing, the user can set the AF position while looking through the viewfinder. Note that when no processing corresponds to the touch-move processing, the processing of S304 is not performed.

When, on the other hand, a touch-move has not been performed in step S304, the system control unit 50 advances to processing of step S306.

Figure 6C:
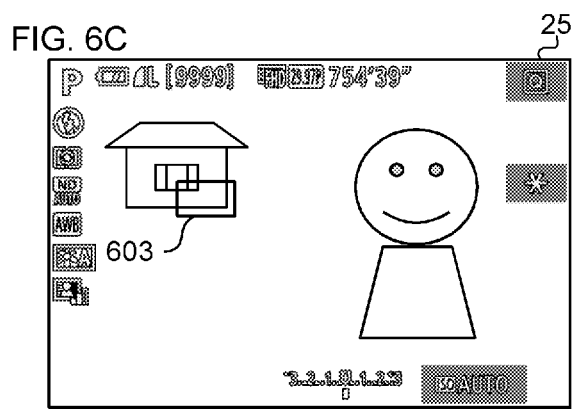

In step S306, the system control unit 50 determines whether or not a touch-up has been performed (i.e. whether or not a touch has been removed) from the touch panel 82. When a touch-up has been performed, the system control unit 50 executes touch-up processing corresponding to the normal setting function in step S307. The "touch-up processing corresponding to the normal setting function" is processing executed when a touch-up is performed on the touch panel 82 in a normal state, i.e. when the user is looking through the viewfinder and the shutter button 61 is not pressed. FIG. 6C shows an example of a display displayed on the viewfinder display unit 25 when single point AF is set as the touchpad function, and in FIG. 6C, the display position of an AF frame 603 is set as the AF position. In response to the touch-up, the AF position is confirmed, and as a result, it is possible to ascertain the display position of the AF frame 603, and to ascertain that AF processing will be performed so as to focus on the subject in the position of the AF frame 603. Note that when no processing corresponds to the touch-up processing, the processing of S306 is not executed.

When, on the other hand, a touch-up has not been performed in step S306, the system control unit 50 advances to the processing of step S308.

In step S308, the system control unit 50 determines whether or not an image pickup preparation instruction has been issued. For example, the system control unit 50 determines that an image pickup preparation instruction has been issued when the shutter button 61 is pressed halfway. When an image pickup preparation instruction has been issued, the system control unit 50 advances to processing of step S309. When an image pickup preparation instruction has not been issued, on the other hand, the system control unit 50 returns to the processing of step S301.

In step S309, the system control unit 50 executes light measurement (light measurement processing), and confirms the ISO sensitivity, the aperture value, and the shutter speed. The image pickup preparation instruction is an operation for executing light measurement and confirming set values relating to image pickup, and once the image pickup preparation instruction has been issued and the set values have been confirmed, the user can execute image pickup at a desired timing. Note that when either the ISO sensitivity or the aperture setting is selected as the normal touchpad function, the set value thereof is confirmed in step S314, to be described below, regardless of the light measurement result.

In step S310, the system control unit 50 determines whether or not the normal setting function is the "AF setting function", and when the normal setting function is the "AF setting function", advances to processing of step S311.

In step S311, the system control unit 50 determines whether or not a touch is underway on the touch panel 82 (i.e. whether or not a touch-on is underway such that the touch panel 82 is currently being touched). When the touch panel 82 is currently being touched, the system control unit 50 advances to step S312.

In step S312, the system control unit 50 determines whether or not the normal setting function is the "single point AF setting function", and when the normal setting function is the "single point AF setting function", the system control unit 50 advances to processing of step S313. When the normal setting function is not the "single point AF setting function" (i.e. when the normal setting function is tracking AF), the system control unit 50 advances to step S315 without performing processing for confirming the AF position in step S313 and switching the assigned function in step S314, to be described below. In step S313, an operation specification unit sets and confirms the position of the cursor at the point where the shutter button 61 is pressed halfway (midway through an operation for pressing the shutter button 61 in order to issue an image pickup instruction) as the AF position of single point AF. Note that the user may be informed of whether or not focusing has been achieved as a result of the light measurement of step S309 and range-finding by changing the color and shape of the AF frame.

Hence, during single point AF, the AF position is confirmed by releasing the touch, but when the shutter button is pressed halfway before the touch is released, the AF position is confirmed at that timing. In this embodiment, the function assigned as the touchpad function is switched in response to issuance of the image pickup preparation instruction, and therefore, when the function is switched before confirming the setting corresponding to the function assigned prior to issuance of the image pickup preparation instruction, the setting returns to the original setting. For example, when the user goes to the trouble of changing the AF position in order to move the AF position to a desired position, but then presses the shutter button halfway without releasing the touch, the AF position returns to the original position. Therefore, in step S313, the AF position is confirmed, and AF processing (focusing processing) is performed. Note that single point AF is confirmed by releasing the touch, while AF processing based on the confirmed position is executed in response to the image pickup preparation instruction. Further, the focus position obtained by the AF processing performed in S313 is not changed until it is determined in step S317, to be described below, that the image pickup preparation instruction has been canceled. In other words, after implementing the AF processing in S313, AF processing is not performed until No is obtained in S317.

Figure 6D:
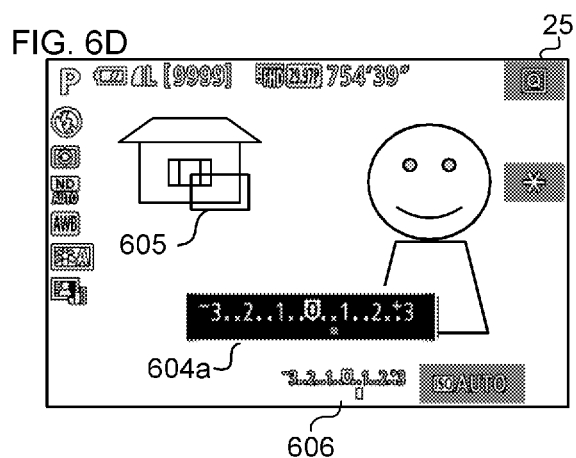

In step S314, the system control unit 50 switches the touchpad function to a setting function used when the image pickup preparation instruction has been issued. In the examples shown in FIGS. 6A to 6D, single point AF is assigned as the touchpad function before the image pickup preparation instruction is issued (from FIGS. 6A to 6C), and therefore the functions obtained after switching the touchpad function in response to the image pickup preparation instruction are as shown in FIG. 5B. More specifically, in the case of single point AF, it is possible to switch to exposure correction, contrast correction, and HDR. In this embodiment, a case in which the touchpad function is switched to exposure correction will be described below. By displaying a display item 604 in S314, as shown in FIG. 6D, the user can be informed that the touchpad function has been switched to exposure correction. Note that a display item 606 also indicates exposure correction, and the display item 606 may either continue to be displayed after the touchpad function is switched, or be deleted when the display item 604 is displayed. By displaying the display item 604 in a larger size than the original display item 606, the user can easily ascertain that the touchpad function has been switched, and the visibility of the set value is also improved. Note that when the touchpad function is switched to a function in which a corresponding display item is not displayed, a display item corresponding to the touchpad function newly set in S314 is displayed. Further, an AF frame 605 in FIG. 6D is not the operation subject of the current touchpad function, and may therefore be displayed using thinner lines. In so doing, the user can ascertain the position of the AF frame while recognizing that the AF frame is no longer the operation subject.

In step S315, the system control unit 50 determines whether or not an image pickup instruction has been issued. The image pickup instruction can be issued by fully pressing the shutter button 61. When the image pickup instruction has been issued, an image pickup processing unit executes image pickup processing in step S316, whereupon the system control unit 50 returns to the processing of step S301. When the image pickup instruction has not been issued, on the other hand, the system control unit 50 advances to processing of step S317.

In step S317, the system control unit 50 determines whether or not the image pickup preparation instruction is currently issued. When the image pickup preparation instruction is currently issued, the system control unit 50 advances to processing of step S318.

When the image pickup preparation instruction has been canceled, on the other hand, the system control unit 50, in step S319, confirms the set value of the setting function set while the image pickup preparation instruction was issued. In other words, since the image pickup preparation instruction has been canceled, the setting of the function switched to in S314 is confirmed, whereupon the touchpad function is switched to the normal function. For example, when one of the "ISO sensitivity setting function", the "HDR setting function", the "contrast setting function", the "aperture setting function", and the "exposure correction setting function" was selected as the setting function while the image pickup preparation instruction was issued, the set value set currently is confirmed. Next, in step S320, the system control unit 50 sets the original normal setting function as the touchpad function. The system control unit 50 then advances to the processing of step S301.

In step S318, the system control unit 50 determines whether or not the touch panel 82 is currently being touched. After determining that the touch panel 82 is currently being touched, the system control unit 50 advances to processing of step S323. After determining that the touch panel 82 is not currently being touched (i.e. when a touch-off has been performed), on the other hand, the system control unit 50 advances to processing of step S321.

In step S321, the system control unit 50 determines whether or not a touch-down has been performed (i.e. whether or not a touch has been started) on the touch panel 82. When a touch-down has been performed, the system control unit 50 advances to processing of step S322. When a touch-down has not been performed, on the other hand, the system control unit 50 advances to the processing of step S315.

In step S322, the system control unit 50 executes touch-down processing for use while the image pickup preparation instruction is issued. More specifically, the system control unit 50 executes processing corresponding to a touch-down performed on the currently set function in relation to the setting function for use while the image pickup preparation instruction is issued. As shown in FIG. 5A, when the touchpad function is switched to exposure correction in S314, no processing corresponding to a touch-down exists in relation to exposure correction, and therefore no processing is performed in S322. In other words, the display on the viewfinder display unit 25 shown in FIG. 6C remains unchanged.

In step S323, the system control unit 50 determines whether or not a touch-move has been performed (i.e. whether or not the touch position has been moved) on the touch panel 82. After determining that a touch-move has been performed, the system control unit 50 advances to processing of step S324. After determining that a touch-move has not been performed, on the other hand, the system control unit 50 advances to processing of step S325.

In step S324, the system control unit 50 executes touch-move processing for use while the image pickup preparation instruction is issued. In a case where the touchpad function is switched to exposure correction in S314, the set value of exposure correction is changed in S324. More specifically, an amount by which the touch position has been moved is obtained, and the set value of exposure correction is changed by an amount corresponding to the movement amount. In the example shown in FIG. 6A, when a touch-move is executed in a rightward direction (an X axis direction), a memory 604*a* is moved by an amount corresponding to the amount of movement in the X axis direction. Note that measures may be taken such that when a touch started prior to issuance of the image pickup preparation instruction is not released, corresponding processing is not executed even after a touch-move operation is performed, but when a touch-move is performed after temporarily releasing the touch, corresponding processing is executed.

In step S325, the system control unit 50 determines whether or not a touch-up from the touch panel 82 has been performed. After determining that a touch-up has been performed, the system control unit 50 advances to processing of step S326. After determining that a touch-up has not been performed (i.e. that the touch is still underway), on the other hand, the system control unit 50 advances to the processing of step S323.

Note that the image pickup instruction may be received before a touch-up is detected in S325. Of the functions that can be set as the touchpad function when the image pickup preparation instruction has been issued, setting is performed in response to a touch-move in all functions other than tracking AF, and therefore image pickup is executed at the set value currently set. Further, in the case of tracking AF, the focus is on the subject in the position of the AF frame, and therefore image pickup processing is executed as is.

In step S326, the system control unit 50 executes touch-up processing for use while the image pickup preparation instruction is issued. In a case where the touchpad function is switched to exposure correction in S314, no processing is performed in S326.

After completing the processing of step S326, the system control unit 50 advances to the processing of step S301. The processing from step S301 onward is then performed repeatedly until it is determined that the processing is to be terminated in step S303.

Next, specific examples relating to the touch-down processing, touch-move processing, and touch-up processing executed in a normal state and while the image pickup preparation instruction is issued will be described.

FIGS. 5A and 5B are views illustrating the touch processing executed in a normal state and while the image pickup preparation instruction is issued. A table in FIG. 5A shows operations corresponding to the touch processing. A setting item column shows the setting functions set on the touch panel 82 in a normal state or while the image pickup preparation instruction is issued, and these setting functions correspond to the setting functions selected on the items "Normally" and "When shutter button is pressed halfway" on the setting screen 401 of FIG. 4. For example, on the table in FIG. 5A, "single point AF (setting function)", "tracking AF (setting function)", and "ISO sensitivity (setting function)" are depicted as setting items. Further, "HDR (setting function)", "contrast (setting function)", "display switching (setting function)", "aperture setting (setting function)", and "exposure correction (setting function)" are depicted as setting items.

In relation to each setting item, the processing executed in response to a touch-down, the processing executed in response to a touch-move, and the processing executed in response to a touch-up are shown in a touch-down column, a touch-move column, and a touch-up column, respectively. When the "single point AF setting function" is selected as the setting item, no processing is performed in response to a touch-down, and the AF position is changed in response a touch-move operation. Further, the operation specification unit confirms the AF position in response to a touch-up.

Meanwhile, when the "tracking AF setting function" is selected as the setting item, a previously set tracking subject is canceled in response to a touch-down, and the position of the cursor is changed in order to select a tracking subject in response to a touch-move operation. Furthermore, the operation specification unit sets the subject existing in the current position of the cursor as the tracking subject and starts executing tracking AF in response to a touch-up. Note that the system control unit 50 may display marks indicating possible tracking AF subjects on the viewfinder display unit 25. As a result, the tracking AF subject can be selected more easily.

Further, when the "ISO sensitivity setting function" is selected as the setting item, the operation specification unit increases the set value when a touch-move is performed in a leftward direction, for example. When one of the "HDR setting function", the "contrast setting function", the "aperture setting function", and the "exposure correction setting function" is selected as the setting item, similar processing is executed. Furthermore, when a touch-move is performed in a rightward direction, the set value is reduced, and when a touch-down or a touch-up is performed, no processing is executed.

Moreover, when the "display switching function" is selected as the setting item, the display is switched to a different display format in response to a touch-down. When a touch-down is performed, various icons displayed on the viewfinder display unit 25 are deleted, and the live view image is displayed alone. Further, when another touch-down is performed, the various icons are displayed on the viewfinder display unit 25, and when a touch-move or a touch-up is performed, no processing is executed.

FIG. 5B is a view showing the manner in which the touchpad function is switched depending on whether or not the image pickup preparation instruction has been issued, using the set values set prior to issuance of the image pickup preparation instruction as a reference. When the image pickup preparation instruction is issued in a state where "ISO sensitivity" has been selected as the touchpad function prior to issuance of the image pickup preparation instruction (i.e. in a normal state), the currently set ISO sensitivity set value is confirmed, and the function assigned as the touchpad function is switched to exposure correction, contrast correction, HDR, or tracking AF. As described above using FIG. 4, the user can select and set one of these functions on the menu screen.

Further, when the "tracking AF setting function" has been selected as the touchpad function prior to issuance of the image pickup preparation instruction (i.e. in a normal state), the function assigned as the touchpad function is not changed even after the image pickup preparation instruction is issued, and therefore tracking AF remains as the touchpad function.

Note that in a case where the normal setting is single point AF, which is also the setting in relation to the AF, once range-finding has been implemented in the AF position selected by the touch operation, there is no need to move the AF position until the shutter button 61 is released. On the other hand, the user may wish to change the exposure correction value while maintaining the focus. In this case, by switching the touchpad function to exposure correction, for example, in response to issuance of the image pickup preparation instruction so that the correction value can be changed by a touch operation, the user can be allowed to change a larger number of functions by performing touch operations, and as a result, an improvement in operability can be achieved. In particular, when the menu screen is displayed and the user performs an operation to adjust the setting while looking through the viewfinder, image pickup is interrupted, the shutter button (on which a finger is already placed in order to implement image pickup), which can be operated by a finger other than the thumb to issue the image pickup preparation instruction, the thumb being used to perform touch operations, is preferably used. Note, however, that in the case of tracking AF, the AF position may be changed in accordance with the position of the subject even after the image pickup preparation instruction is issued, and therefore the assigned function is not changed.

Further, when "exposure correction" was selected as the touchpad function prior to issuance of the image pickup preparation instruction (i.e. in a normal state), the function assigned as the touchpad function may be changed to tracking AF upon issuance of the image pickup preparation instruction. The user may wish to change the AF position in response to movement of the subject after executing range-finding at the exposure correction value. In this case, the user can assign tracking AF as the touchpad function and change the position in which tracking AF is to be performed by means of a touch operation after issuing the image pickup preparation instruction. Note, however, that with single point AF, there are few cases where the AF position is changed in accordance with the position of the subject after the image pickup preparation instruction has been used, and therefore the assigned function is not changed.

Note that when tracking AF is set as the normal touchpad function, it is assumed that the user has already specified the AF subject, and that the camera will execute AF by tracking the AF subject automatically thereafter. Hence, an item other than AF may be assigned.

In a state where the shutter button is pressed halfway, a setting item other than the "single point AF setting function" may be set as the touchpad function. The reason for this is that in the case of single point AF, the focus position is not changed after implementing AF processing in response to issuance of the image pickup preparation instruction, whereas in the case of tracking, the focus position is changed in response to movement of the subject even after the image pickup preparation instruction has been issued.

Note that when setting for aligning a light measurement position with the AF position is executed while single point AF is set, the user may wish to change the light measurement position while checking the condition of the subject after the image pickup preparation instruction has been issued, despite single point AF currently being set. Therefore, measures may be taken to ensure that when setting is performed to align the light measurement position with the AF position, an operation to change the light measurement position can be received even after the image pickup preparation instruction has been issued.

Further, when the image pickup preparation instruction is issued in a state where "display switch function" has been selected as the touchpad function prior to issuance of the image pickup preparation instruction (i.e. in a normal state), one of exposure correction, contrast correction, HDR, and tracking AF is set as the function assigned as the touchpad function. Note that when a touch-down is performed while the display switch function is set, processing to change the display has already been executed, and therefore, similarly to the ISO sensitivity, the resulting value is not confirmed in response to the image pickup preparation instruction.

With respect to items other than tracking AF, when the image pickup preparation instruction is canceled, the touchpad function is switched back to the original item.

According to the embodiment described above, the touchpad function is switched depending on whether or not the image pickup preparation instruction has been issued, and therefore the user can set a larger number of functions by means of touch operations while looking through the viewfinder.

When single point AF is initially set as the setting item of the touchpad function, AF processing is performed in the set AF position after the image pickup preparation instruction is issued, and thereafter, settings such as exposure correction and contrast correction can be changed by performing touch operations while looking through the viewfinder. Hence, before issuing the image pickup preparation instruction, the user can perform an operation to set the AF position to be confirmed by issuing the image pickup preparation instruction, for example, and while the image pickup preparation instruction is issued, the user can perform a touch operation to adjust the exposure correction and so on. Moreover, when a setting other than AF, such as the ISO sensitivity or the aperture, is initially set as the touchpad function, the setting of the ISO sensitivity, the aperture, or the like can be confirmed by issuing the image pickup preparation instruction, and thereafter, the subject to be tracked can be set unhurriedly, for example.

Note that measures may be taken to ensure that when a touch (a touch-on) started before issuing the image pickup preparation instruction is maintained thereafter, the function is not switched in response to issuance of the image pickup preparation instruction, and instead, the touchpad function is switched to the function used while the image pickup preparation instruction is issued at a release timing of the touch.

Further, every time the touchpad function is switched, guidance (a guide) indicating that the touchpad function has been switched may be displayed to the user.

Note that the various types of control described above may be executed by a single piece of hardware, or overall control may be executed on the device by apportioning the processing to a plurality of pieces of hardware.

An embodiment of the present invention was described above, but the technical scope of the present invention is not limited to the scope of the embodiment, and various amendments and modifications may be applied thereto within the scope of the spirit of the invention. The single point AF setting function, the tracking AF setting function, the ISO sensitivity setting function, the HDR setting function, the contrast setting function, the aperture setting function, and the exposure correction setting function were cited above as the normal setting functions and the setting functions for use while the image pickup preparation instruction is issued, but the present invention is not limited thereto. For example, functions for changing the imaging magnification, the shutter speed, the F value, and the light measurement position in the viewfinder display unit 25 may be set as the normal setting functions and the setting functions for use while the image pickup preparation instruction is issued. Further, drive setting, aspect ratio setting, live view display magnification setting, and camera functions such as deleting or editing a captured image may be set as the normal setting functions and the setting functions for use while the image pickup preparation instruction is issued.

Note that in the embodiment described above, an example in which the image pickup preparation instruction is issued by pressing the shutter button 61 halfway was described, but the present invention is not limited thereto, and a state in which the touchpad function is switched may be established by operating another member (i.e. without issuing the image pickup preparation instruction). At this time, it is envisaged that touchpad operations are performed using the thumb of the right hand, and therefore an operating member assumed to be operated by a finger other than the thumb, for example a ring around the lens barrel or the like, may be used. As a result, an improvement in usability can be expected. The shutter button, another button or dial, which can be operated using the index finger or the like rather than the thumb used to operate the touch panel, may also be used. Note that in a case where an operating member for switching the touchpad function is provided and the function is switched by pressing this operating member, the setting item may be returned to the original item by pressing the shutter button 61 halfway.

Furthermore, according to the above description, set values relating to light measurement, the ISO sensitivity, the aperture, the shutter speed, and so on are fixed while the image pickup preparation instruction is issued, but this processing does not necessarily have to be executed in response to issuance of the image pickup preparation instruction. In other words, an instruction (a predetermined instruction) to switch the function of the touchpad may be received instead of the image pickup preparation instruction (or as a separate instruction to the image pickup preparation instruction). The instruction to switch the touchpad may be issued by implementing a double tap or long tap operation on the touch panel 82. Alternatively, a specific operating member may be pressed, and an operating member that can be operated with a finger other than the thumb, as described above, may be used.

Moreover, in the embodiment described above, the touchpad function is received while the user looks through the viewfinder, but the present invention is not limited thereto, and the above embodiment may also be applied in a state where the user views the live view image on the display unit 28.

Further, depending on the situation, the cursor 602 shown in FIG. 6B may be varied in size or formed in a shape other than a single frame. For example, when a plurality of AF points are displayed instead of a cursor, as in the case of an optical viewfinder or the like, and the position of a touch is to be indicated, the touched position may be indicated by changing the colors of the plurality of AF points or the like in accordance with the position and surface area of the touching finger.

Furthermore, in the above embodiment, an example in which the present invention is applied to the digital camera 100 was described, but the present invention is not limited to this example, and may be applied to any image pickup apparatus capable of receiving touch operations. For example, the present invention may be applied to a personal computer or a PDA having a touch panel, a portable telephone terminal or a portable image viewer, a printer device having a display, a digital photo frame, a music player or game machine, and so on. The present invention may also be applied to an electronic reader, a tablet terminal, a smartphone, a projection device, a household appliance or in-vehicle device having a display, and so on.

Moreover, in the above embodiment, an example in which the touch panel 82 is used as a touchpad was described, but the present invention is not limited thereto, and a touchpad for detecting touch operations performed by a user may be provided on the digital camera 100 separately to the touch panel 82.

According to the present invention, an improvement in operability can be achieved when switching an item in relation to which a setting is changed by a touch operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-18604, filed on Feb. 3, 2017, which is hereby incorporated by reference herein in its entirety.

What is claimed is:

1. An image pickup apparatus comprising at least one memory and at least one processor which function as:
   a touch detecting unit configured to be capable of detecting a touch operation performed on a touch panel;
   a viewfinder display unit configured to display a display indicating a set value of an item inside a viewfinder; and
   a control unit configured to execute control such that, in a case where a subject image is visible through the viewfinder,
   a first display of a set value of a first item is changed in response to a first movement of a touch position on the touch panel when the first movement is performed while a predetermined operation relating to image pickup is not being performed,
a first function relating to the first item is performed based on the set value of the first item, and an item of which a set value is changeable in response to a movement of a touch position on the touch panel is changed from the first item to a second item, in response to the predetermined operation, and
a second display of a set value of the second item is changed in response to a second movement of a touch position on the touch panel when the second movement is performed while the predetermined operation being performed, wherein
the first item can be selected from a plurality of items including any of autofocus (AF) processing, ISO sensitivity, high dynamic range (HDR), contrast, aperture setting, and exposure setting,
when AF processing is selected as the first item, the control unit executes control to move a display position, within the viewfinder display unit, of a display item indicating a position in which AF processing is to be implemented after detecting movement of a touch position on the touch panel, and
the control unit executes control such that AF processing is executed on the basis of a position in which the display item is displayed after detecting that a touch is being released in a state where the predetermined operation is not being performed, and such that AF processing is executed on the basis of the position in which the display item is displayed in response to the predetermined operation in a case where the touch is not released before the predetermined operation is performed.

2. The image pickup apparatus according to claim 1, wherein, in response to the predetermined operation, light measurement processing is executed and at least one set value relating to image pickup is determined.

3. The image pickup apparatus according to claim 1, wherein an operating member for receiving the predetermined operation can be operated by a different finger from a finger used to operate the touch panel.

4. The image pickup apparatus according to claim 1, wherein the predetermined operation is an operation for setting a shutter button in a depression state midway through an operation for pressing the shutter button in order to issue an image pickup instruction.

5. The image pickup apparatus according to claim 1, wherein the predetermined operation is an image pickup preparation instruction.

6. The image pickup apparatus according to claim 1, wherein the control unit executes control to display a display item indicating the set value of at least one of the first item and the second item on the viewfinder display unit.

7. The image pickup apparatus according to claim 1, wherein, when the first item is AF processing, the second item is exposure correction.

8. The image pickup apparatus according to claim 1, wherein the item that can be selected as the second item differs between a case in which one of ISO sensitivity, HDR, contrast, aperture setting, and exposure setting is selected as the first item, and a case in which AF processing is selected as the first item.

9. The image pickup apparatus according to claim 1, wherein the control unit executes control such that, in a case where a fourth movement of a touch position on the touch panel is being performed when the predetermined operation is executed, the item, of which the set value is to be switched by performing the fourth movement, is not switched from the first item to the second item even after executing the predetermined operation.

10. The image pickup apparatus according to claim 9, wherein the control unit executes control such that, in a case where a fifth movement of a touch position on the touch panel is being performed when the predetermined operation is executed, the item, of which the set value is to be switched by performing the fifth movement, is switched from the first item to the second item after the touch is released from the touch panel.

11. The image pickup apparatus according to claim 1, wherein the control unit executes control such that when the item, of which the set value is to be switched by performing a touch movement on the touch panel, is switched, a guide indicating that the item is being switched is displayed on the viewfinder display unit.

12. An image pickup apparatus comprising at least one memory and a t least one processor which function as:
a touch detecting unit configured to be capable of detecting a touch operation performed on a touch panel;
a viewfinder display unit configured to display a display indicating a set value of an item inside a viewfinder; and
a control unit configured to execute control such that, in a case where a subject image is visible through the viewfinder,
a first display of a set value of a first item is changed in response to a first movement of a touch position on the touch panel when the first movement is performed while a predetermined operation relating to image pickup is not being performed,
a first function relating to the first item is performed based on the set value of the first item, and an item of which a set value is changeable in response to a movement of a touch position on the touch panel is changed from the first item to a second item, in response to the predetermined operation, and
a second display of a set value of the second item is changed in response to a second movement of a touch position on the touch panel when the second movement is performed while the predetermined operation being performed, wherein
the first item can be selected from a plurality of items including any of autofocus (AF) processing, ISO sensitivity, high dynamic range (HDR), contrast, aperture setting, and exposure setting, and
the control unit executes control such that when single point AF is selected as the first item, the set value of the second item is changed in response to the second movement after the predetermined operation is being executed, and when tracking AF is selected as the first item, a position in which tracking AF is to be executed is changed in response to a third movement of a touch position on the touch panel even after the predetermined operation is being executed.

13. A control method for an image pickup apparatus having a viewfinder display unit for displaying a display indicating a set value of an item inside a viewfinder, the control method comprising:
detecting a touch operation performed on a touch panel; and
executing control such that, in a case where a subject image is visible through the viewfinder,
a first display of a set value of a first item is changed in response to a first movement of a touch position on the touch panel when the first movement is performed while a predetermined operation relating to image pickup not being performed,
a first function relating to the first item is performed based on the set value of the first item, and an item, of which a set value is changeable in response to a movement of a touch position on the touch panel, is changed from the first item to a second item, in response to the predetermined operation, and
a second display of a set value of the second item is changed in response to a second movement of a touch position on the touch panel when the second movement is performed while the predetermined operation is being performed, wherein
the first item can be selected from a plurality of items including any of autofocus (AF) processing, ISO sensitivity, high dynamic range (HDR), contrast, aperture setting, and exposure setting,
when AF processing is selected as the first item, control is executed to move a display position, within the viewfinder display unit, of a display item indicating a position in which AF processing is to be implemented after detecting movement of a touch position on the touch panel, and
control is executed such that AF processing is executed on the basis of a position in which the display item is displayed after detecting that a touch is being released in a state where the predetermined operation is not being performed, and such that AF processing is executed on the basis of the position in which the display item is displayed in response to the predetermined operation in a case where the touch is not released before the predetermined operation is performed.

14. A non-transitory computer readable storing medium recording a computer program for causing a computer to perform a control method for an image pickup apparatus having a viewfinder display unit for displaying a display indicating a set value of an item inside a viewfinder, the control method includes:
detecting a touch operation performed on a touch panel; and
executing control such that, in a case where a subject image is visible through the viewfinder,
a first display of a set value of a first item is changed in response to a first movement of a touch position on the touch panel when the first movement is performed while a predetermined operation relating to image pickup is not being performed,
a first function relating to the first item is performed based on the set value of the first item, and an item, of which a set value is changeable in response to a movement of a touch position on the touch panel, is changed from the first item to a second item, in response to the predetermined operation, and
a second display of a set value of the second item is changed in response to a second movement of a touch position on the touch panel when the second movement is performed while the predetermined operation being performed, wherein
the first item can be selected from a plurality of items including any of autofocus (AF) processing, ISO sensitivity, high dynamic range (HDR), contrast, aperture setting, and exposure setting,
when AF processing is selected as the first item, control is executed to move a display position, within the viewfinder display unit, of a display item indicating a position in which AF processing is to be implemented after detecting movement of a touch position on the touch panel, and
control is executed such that AF processing is executed on the basis of a position in which the display item is displayed after detecting that a touch is being released in a state where the predetermined operation is not being performed, and such that AF processing is executed on the basis of the position in which the display item is displayed in response to the predetermined operation in a case where the touch is not released before the predetermined operation is performed.

15. A control method for an image pickup apparatus having a viewfinder display unit for displaying a display indicating a set value of an item inside a viewfinder, the control method comprising:
detecting a touch operation performed on a touch panel; and
executing control such that, in a case where a subject image is visible through the viewfinder,
a first display of a set value of a first item is changed in response to a first movement of a touch position on the touch panel when the first movement is performed while a predetermined operation relating to image pickup not being performed,
a first function relating to the first item is performed based on the set value of the first item, and an item, of which a set value is changeable in response to a movement of a touch position on the touch panel, is changed from the first item to a second item, in response to the predetermined operation, and
a second display of a set value of the second item is changed in response to a second movement of a touch position on the touch panel when the second movement is performed while the predetermined operation is being performed, wherein
the first item can be selected from a plurality of items including any of autofocus (AF) processing, ISO sensitivity, high dynamic range (HDR), contrast, aperture setting, and exposure setting, and
control is executed such that when single point AF is selected as the first item, the set value of the second item is changed in response to the second movement after the predetermined operation is being executed, and when tracking AF is selected as the first item, a position in which tracking AF is to be executed is changed in response to a third movement of a touch position on the touch panel even after the predetermined operation is being executed.

16. A non-transitory computer readable storing medium recording a computer program for causing a computer to perform a control method for an image pickup apparatus having a viewfinder display unit for displaying a display indicating a set value of an item inside a viewfinder, the control method includes:
detecting a touch operation performed on a touch panel; and
executing control such that, in a case where a subject image is visible through the viewfinder,
a first display of a set value of a first item is changed in response to a first movement of a touch position on the touch panel when the first movement is performed while a predetermined operation relating to image pickup is not being performed,
a first function relating to the first item is performed based on the set value of the first item, and an item, of which a set value is changeable in response to a movement of a touch position on the touch panel, is changed from the first item to a second item, in response to the predetermined operation, and a second display of a set value of the second item is changed in response to a second movement of a touch position on the touch panel when the second movement is performed while the predetermined operation being performed, wherein the first item can be selected from a plurality of items including any of autofocus (AF) processing, ISO sensitivity, high dynamic range (HDR), contrast, aperture setting, and exposure setting, and control is executed such that when single point AF is selected as the first item, the set value of the second item is changed in response to the second movement after the predetermined operation is being executed, and when tracking AF is selected as the first item, a position in which tracking AF is to be executed is changed in response to a third movement of a touch position on the touch panel even after the predetermined operation is being executed.

\* \* \* \* \*